United States Patent [19]

Kobayashi et al.

[11] Patent Number: 5,117,104

[45] Date of Patent: May 26, 1992

[54] ANGULAR DISPLACEMENT DETECTING DEVICE UTILIZING A TUBULAR CASING HAVING A CHAMBER WHEREIN A FLUOROLIQUID IS SEALED

[75] Inventors: Naoki Kobayashi, Tokyo; Kazuhiro Oki; Shoichi Shimura, both of Kanagawa, all of Japan

[73] Assignee: Canon Kabushiki Kaisha, Tokyo, Japan

[21] Appl. No.: 628,185

[22] Filed: Dec. 17, 1990

[30] Foreign Application Priority Data

Dec. 21, 1989 [JP] Japan .................................. 1-331743

[51] Int. Cl.$^5$ .............................................. G01D 5/30
[52] U.S. Cl. ................................. 250/230; 250/231.13
[58] Field of Search ..................... 250/231.13, 231.19, 250/229, 230, 231.12; 525/256; 526/247; 548/323

[56] References Cited

U.S. PATENT DOCUMENTS 3,796,393  3/1974  Beistle ........................... 250/231.19
4,835,384  5/1989  Jones et al. ..................... 250/231.13

Primary Examiner—David C. Nelms
Assistant Examiner—T. Davenport
Attorney, Agent, or Firm—Robin, Blecker, Daley & Driscoll

[57] ABSTRACT

An angular displacement detecting device is provided with a tubular casing having a chamber in which a liquid is sealed, a floating body disposed in the liquid sealed in the chamber and supported for rotation about a predetermined rotational axis, and a detector for detecting the relative angular displacement between the floating body and the tubular casing about the rotational axis. This device employs a fluoroliquid as the aforesaid liquid.

36 Claims, 3 Drawing Sheets

ANGULAR DISPLACEMENT DETECTING DEVICE UTILIZING A TUBULAR CASING HAVING A CHAMBER WHEREIN A FLUOROLIQUID IS SEALED

BACKGROUND OF THE INVENTION

1. Field of the Invention

The present invention relates to a device for detecting an angular displacement relative to absolute space by utilizing the inertia of a liquid and, for example, to an angular displacement detecting device suitable for use in detecting an image shake which may occur during photography using a camera.

2. Description of the Related Art

A conventional angular displacement detecting device of this type is basically constructed as described below in detail, as disclosed in U.S. patent application Ser. No. 355,330, filed on May 23, 1989, and Japanese Laid-open Patent Application Nos. Hei 2-82165 and Hei 2102414. The construction will be explained with reference to FIGS. 3 to 5.

As shown in these figures, the conventional angular displacement detecting device comprises a base 101 to which individual parts for constituting the device are secured in position, and a tubular casing 102 serving as a sealed liquid container having a chamber in which a floating body 103 and a liquid 104 are sealed. The tubular casing 102 has a groove 102a which is formed in its inner wall so as to securely engage with a floating-body support 114 having a U-like cross section as shown in detail in FIG. 5. The floating body 103 has magnetic characteristics, and is supported for rotation about an axis 103a by the floating-body support 114. Mirrors 109 are respectively secured to one pair of opposed side faces of the central block of the floating body 103, and each of the mirrors 109 is covered by a mask 110 having a slit 110a. Arms 103b extend from the other pair of opposed side faces of the central block, respectively. The floating body 103 is constructed so as to maintain the balance of rotation about the axis 103a and the balance of buoyancy in the liquid 104.

It is to be noted that the tubular casing 102 is, as described above, charged with the liquid 104 in a sealed manner.

A light emitting element (IRED) 105, which is adapted to emit light by energization, is secured to the base 101 via a light-emitting-element carrier 107. A light receiving element (PSD) 106 utilizes a photoelectric conversion device whose output varies with the position where light is received, and is fixed to the base 101 via a light-receiving-element carrier 108. The light emitting element 105 and the light receiving element 106 constitute optical angular displacement detecting means of the type which transmits light by means of either of the mirrors 109 secured to the opposed side faces of the central block of the floating body 103. A light guide portion 107a is formed on the light-emitting-element carrier 107 for guiding light emitted from the light emitting element 105, and a mask 110, is secured to the distal end of the light guide portion 107a. The mask 110, has a slit 110a' identical to the slit 110a of the mask 110. Since the light transmission is effected through the tubular casing 102, the whole or a predetermined portion of the tubular casing 102 is formed of a transparent material.

A pair of yokes 119 and 120 is disposed in such a manner as to produce a magnetic field action for holding the floating body 103 having the magnetic characteristics in a fixed position, i.e., in a position where the floating body 103 takes the shown attitude. Ends 119a and 120a of the respective yokes 119 and 120 are opposed to and spaced apart from each other along the diameter of the tubular casing 102 as shown in FIG. 3. A yoke 121 is interposed between the other end portions of the yokes 119 and 120, and a solenoid coil 122 is fitted onto the yoke 121. The above-described arrangement allows a magnetic circuit to be formed by the yokes 119, 120 and 121 and the floating body 103, and a magnetic force is imparted to the floating body 103 by the magnetic force produced by the solenoid coil 122.

The above-described rotatable supporting of the floating body 103 is accomplished in the following manner. As shown in FIG. 4 in cross-sectional form, a rotary shaft 111 extends through the central block of the floating body 103 in the vertical direction, and a pivot 112 having an outwardly pointed end is press-fitted into each of the top and bottom ends of the rotary shaft 111. Pivot bearings 113 are respectively secured to the upper and lower arms of the U-like shape of the above-described floating body support 114 in such a manner that they are opposed to each other in the inward direction. The floating body 103 is supported by the engagement between the pointed ends of the pivots 112 and the corresponding pivot bearings 113.

A lid 115 is bonded to the tubular casing 102 in a sealed manner by a known art utilizing a silicone adhesive or the like. A packing rubber 116 is sandwiched between a pressure disk 117 and the lid 115, and is fixed by screws or the like.

In the above described arrangement, the floating body 103 is constructed so that the balance of rotation about the axis 103a and the balance of buoyancy in the liquid 104 can be maintained as described previously in order to prevent an angular moment from occurring by the influence of gravitation whatever attitude the floating body 103 may take, and to prevent substantial loads from acting on the pivots or the pivot bearings.

According to the above-described arrangement, even if the tubular casing 102 rotates about the rotational axis 103a, an inner portion of the liquid 104 does not move owing to inertia and, therefore, the floating body 103 which is in a floating state does not rotate. As a consequence, the tubular casing 102 and the floating body 103 rotate about the rotational axis 103a with respect to each other. This is the principle of the device for detecting a relative angular displacement, and the relative angular displacement can be detected by the optical detecting means utilizing the light emitting element 105 and the light receiving element 106.

In practice, a flow is produced in the inner portion of the liquid 104 by the influence of the wall surface of the tubular casing 102, and the flow applies a viscosity force to the floating body 103. The influence of the flow, however, can be minimized by appropriately selecting factors such as the distance between the wall surface and the floating body 103 and the viscosity of the liquid 104.

In the device having the above-described arrangement, detection of an angular displacement is accomplished in the following manner.

Light emitted from the light emitting element 105 passes through the light guide 107a and illuminates the floating body 103, and light reflected by an illuminated one of the mirrors 109 reaches the light receiving element 106. As described above, the mask 110, is secured to the distal end of the light guide 107a, while the mask 110 is secured to each of the mirrors 109 of the floating body 103. Accordingly, the light is approximately collimated by the slit 110a of the mask 110 during light transmission, whereby a sharply focused image (slit image) is formed on the light receiving element 106.

The tubular casing 102, the light emitting element 105 and the light receiving element 106 integrally move since all of them are secured to the base 101. If a relative angular displacement occurs between the tubular casing 102 and the floating body 103, the slit image on the light receiving element 106 will move by an amount corresponding to the relative angular displacement. Accordingly, the light receiving element 106, which utilizes a photoelectric conversion device whose output varies with the position where light is received, produces an output substantially proportional to the positional displacement of the slit image. It is, therefore, possible to detect the angular displacement of the tubular casing 102 by utilizing such an output as information.

In the case of the angular displacement detecting device having the above-described arrangement, since the floating body 103 is not subjected to an external force, the attitude of the floating body 103 cannot be restricted. As a result, it might be considered impossible to ensure that the slit image is positioned within the measurement range of the light receiving element 106. However, if, for example, the above-described solenoid coil 122 is used to exert a weak magnetic field action on the floating body 103, the magnetic field action can be made to act as a spring force which produces a force locating the floating body 103 at the steady position shown in FIG. 3.

The spring force exerted on the floating body 103 by the magnetic field action is theoretically a force which maintains the floating body 103 in a fixed attitude with respect to the tubular casing 102, i.e., a force which acts to move the floating body 103 integrally with the tubular casing 102. If such spring force is excessively strong, the tubular casing 102 and the floating body 103 will move integrally, thus resulting in the problem that a relative angular displacement required for a desired angular displacement is not produced. However, if the magnetic field action is made sufficiently small with respect to the inertia of the liquid 104, it is possible to realize an arrangement capable of responding to an angular displacement of relatively low frequency as well.

The liquid 104 sealed in the tubular casing 102 constitutes an important factor which determines the performance and size of the device. Accordingly, the liquid is required to have physical properties such as high specific gravity, low viscosity, light transmission properties, chemical/physical stability and low vapor pressure as well as stable physical properties which do not greatly vary with temperature change.

The specific gravity is useful in that the present detecting device utilizes inertia and as the moment becomes larger, measurement sensitivity is improved, i.e., it becomes possible to detect an angular displacement of lower frequency. The high specific gravity also makes it possible to achieve a compact arrangement without substantially reducing the measurement sensitivity.

The viscosity of the liquid 104 cooperates with the wall surface of the tubular casing 102 to integrally move the tubular casing 102 and the floating body 103. As a result, as the viscosity of the liquid 104 increases, the measurement sensitivity deteriorates. Accordingly, as the viscosity is made smaller, the measurement sensitivity is improved. If the gap between the wall surface of the tubular casing 102 and the floating body 103 is made small, it is possible to achieve a compact arrangement without substantially reducing the measurement sensitivity.

The light transmission properties are required to implement position detection utilizing light emitting and receiving elements.

The chemical/physical stability is required to prevent the liquid 104 from deteriorating by reaction with the tubular casing 102, the floating body 103 or the like. In addition, the chemical/physical stability is required to stably use the device for a long time without swelling or elution of the tubular casing 102, the floating body 103 or the like. Such stability is also required to prevent the liquid 104 from affecting an organism or an environmental system even if the device is broken into element pieces and the liquid 104 is scattered during disposal.

The low vapor pressure is required to prevent an explosion due to evaporation of the liquid during temperature rise or to prevent the liquid from vaporizing through a container during a long service.

If the physical properties tend to greatly vary with temperature change, the characteristics of the device will be greatly influenced by variations in operating environments, with the result that the practicability of the device will be impaired.

As described above, limitations imposed on the liquid are strict. However, a conventional type of liquid generally has the problem that, if its viscosity is made low, the vapor pressure may become high, a tubular casing or a floating body may be swollen, or phenomena such as decomposition of the liquid may occur due to limited chemical stability. As a result, it has been impossible to stably use the conventional liquid for a long time.

SUMMARY OF THE INVENTION

It is, therefore, an object of the present invention to provide an angular displacement detecting device capable of solving the above-described conventional problems and of detecting an angular displacement stably and highly accurately for a long time by utilizing a fluoroliquid.

To achieve the above object, according to one preferred form of the present invention, there is provided an angular displacement detecting device which is provided with a tubular casing having a chamber in which a liquid is sealed, a floating body disposed in the liquid sealed in the chamber and supported for rotation about a predetermined rotational axis, and detecting means for detecting the relative angular displacement between the floating body and the tubular casing about the rotational axis, such device employing a fluoroliquid as the aforesaid liquid.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
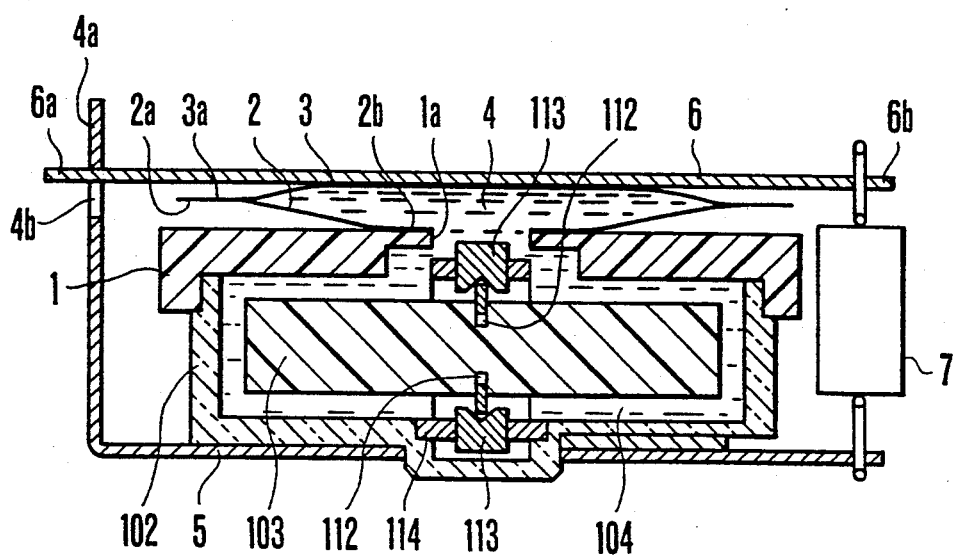
FIG. 1 is a diagrammatic cross-sectional view of an angular displacement detecting device, showing one embodiment of the present invention.

FIG. 1 is a diagrammatic cross-sectional view of an angular displacement detecting device, showing one embodiment of the present invention. In FIG. 1, like reference numerals are used to denote elements which perform functions similar to those of the elements used in the above-described conventional example, and description thereof is omitted for the sake of simplicity.

Referring to FIG. 1, predetermined elements such as a floating body 103 are incorporated in a tubular casing 102, and a lid 1 is bonded to the tubular casing 102 in a sealed manner by a known art utilizing an adhesive, welding or the like. An opening 1a is formed in the center of the lid 1. Thin resin films 2 and 3 are formed of polyethylene or the like, and are thermally welded to each other around their respective outer peripheries 2a and 3a to form a substantially disk-shaped bag structure. An aperture corresponding to the opening 1a is formed in the center of the thin resin film 2, and a peripheral portion 2b which defines the aperture is welded to the peripheral portion of the lid 1 which defines the opening 1a. A capacity adjusting chamber 4 is formed by the thin resin films 2 and 3, and communicates with the interior of the tubular casing 102 through the opening 1a. The tubular casing 102 is secured to a base 5, and a projection 4a having a hole 4b is formed on one folded end of the base 5. A pressure plate 6 is inserted through the hole 4b of the base 5 at one end 6a with a spring 7 secured to the other end 6b, so that the pressure plate 6 presses the thin resin film 3.

The capacity adjusting chamber 4 is pressed by the spring 7 to increase the pressure within the space in which the liquid 104 is sealed, thereby preventing bubbles from resulting from the liberation of gas solved in the sealed liquid 104 and thereby preventing the sealed liquid container from being broken due to a pressure increase caused by a temperature increase. In addition, during a temperature decrease, the capacity adjusting chamber 4 is reduced while following the shrinkage of the volume of the sealed liquid 104, thereby preventing occurrence of bubbles.

It is preferable that a material having a good transmission for infrared rays, such as polycarbonate, polystyrene or TPX, be used as the material of the tubular casing 102.

To facilitate fabrication of the lid 1 and the tubular casing 102, it is preferable to omit certain process steps such as bonding by forming the lid 1 and the tubular casing 102 out of the same material and effecting highly reliable sealing utilizing welding. In this case, it is desirable to use a material such as linear low-density polyethylene or polypropylene.

The material of the floating body 103 may be a resin of any kind that can be blended with magnetic powder because it is necessary to magnetize the floating body 103. For example, it is possible to use a wide variety of engineering plastics such as polyethylene terephthalate, polybutylene telephthalate and nylon.

It is preferable that the liquid 104 sealed in the tubular casing 102 be a fluoroliquid.

The material of the fluoroliquid is preferably selected from among fluoroalkane, fluoroalkene, fluoroalkyne, polyfluoroalkyl (poly)ether, cyclic fluoro(poly)ether, a nitrogen containing fluorocompound, a sulfur-containing fluorocompound, derivatives thereof and x the like. In particular, to achieve superior chemical/physical stability, high specific gravity and low viscosity, it is desirable that the fluoroliquid be a polyperfluoro-type fluoroliquid containing perfluoroalkane, polyperfluoroalkyl (poly)ether, cyclic fluoro(poly)ether, a nitrogen containing polyperfluorocompound or the like. Otherwise, it is also possible to utilize commercially available compounds which are mass-produced and stable in quality. Typical examples are Galden or Fomblin by Enimont Japan Limited which is a trade name for a particular kind of polyperfluoroether, or Fluorinert by Sumitomo 3M Limited which is a trade name for a fluoroliquid.

EXAMPLE 1

An angular displacement detecting device was prepared which employed a fluoroliquid composed of polyperfluoroalkyl polyether, Galden DO2 by Enimont Japan Limited. Although aged for 1,000 hours at 80° C., the liquid did not suffer decomposition or discoloration. Elements such as a container and a floating body were only swollen by up to 0.1%, and no problem such as elution was observed.

Since the viscosity was extremely low at 10 cp or below at −20° C., the device was able to serve its performance without any impairment even in the case of detection of an angular displacement of low frequency.

The vapor pressure was 1 Torr or below, and only components of low molecular weight were vaporized through the container by 0.02% when the liquid was aged for 100 hours at 80° C. Thereafter, no change was observed and it was found that a stably usable angular displacement detecting device was obtained.

EXAMPLE 2

A fluoroliquid utilizing Fluorinert FC-75 (trade name) manufactured by Sumitomo 3M Limited was prepared. Although aged for 1,000 hours at 80° C., the liquid did not suffer decomposition or discoloration. Elements such as a container and a floating body were only swollen by up to 0.3%, and no problem such as elution was observed.

Since the viscosity was extremely low at 4 cp or below at −20° C., the device was able to serve its performance without any impairment even in the case of detection of an angular displacement of low frequency.

The vapor pressure was 31 Torr (at 25° C.), but it was possible to suppress the ratio of vaporization to 0.2% for 600-hour aging at 80° C. by increasing the wall thickness of the tubular casing 102 and the lid 1 to 1 mm or more and by forming the thin resin films 2 and 3 from a laminated film of, e.g., ErOH having low gas permeability. In this case as well, a stably usable angular displacement detecting device was obtained.

As is apparent from the foregoing, the fluoroliquid is stable chemically and physically and does not exert a substantial influence, such as swelling or elution, on a generally available resin of any kind that includes a resin which is used for the above-described floating body and tubular casing. The liquid has characteristics which do not greatly vary with temperature. Accordingly, the liquid is extremely suitable for use as the liquid 104 sealed in the tubular casing 102, and the use of such liquid makes it possible to provide an angular displacement detecting device capable of achieving highly accurate and stable detection of an angular displacement over an extended period of time.

Figure 2:
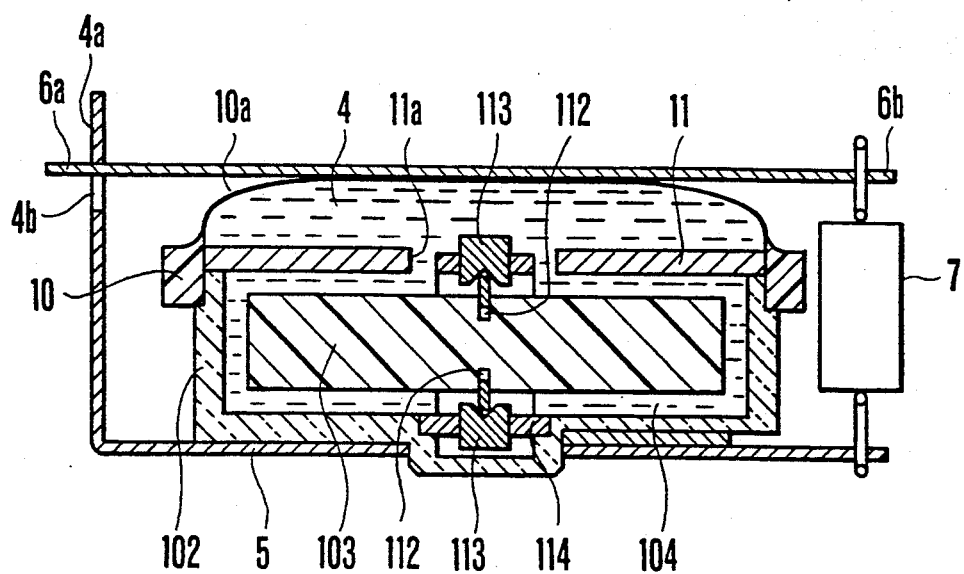
FIG. 2 is a diagrammatic cross-sectional view of an angular displacement detecting device, showing another embodiment of the present invention.
Figure 3:
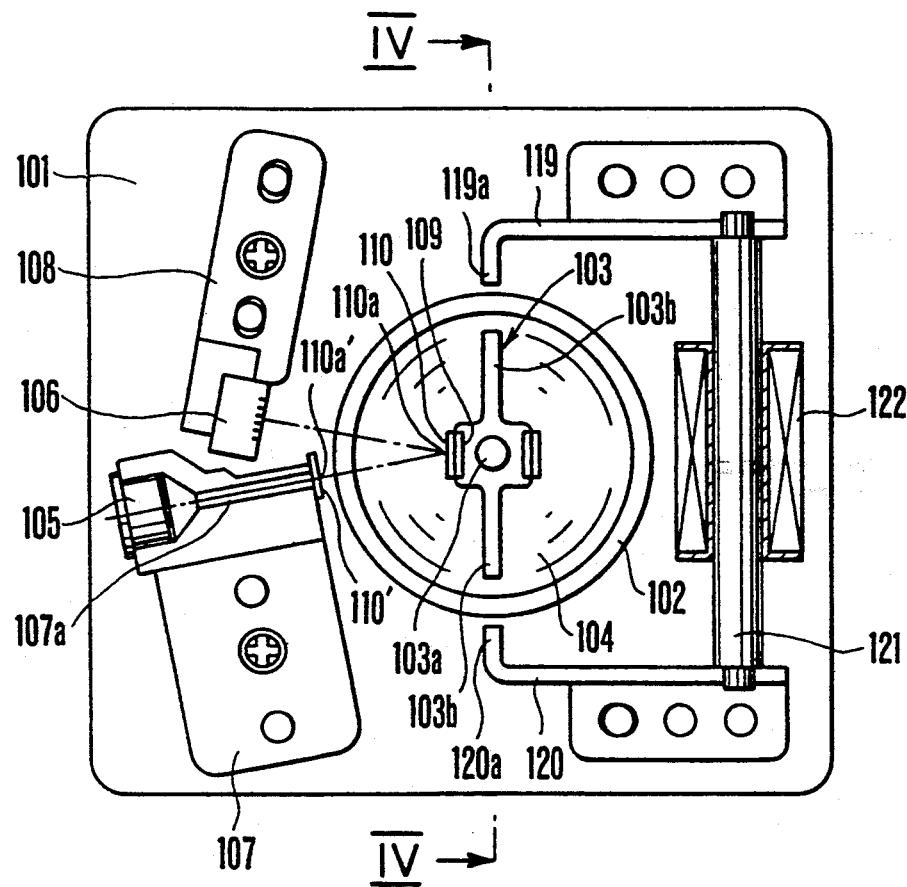
FIG. 3 is a diagrammatic plan view which is used for explaining a conventional angular displacement detecting device.
Figure 4:
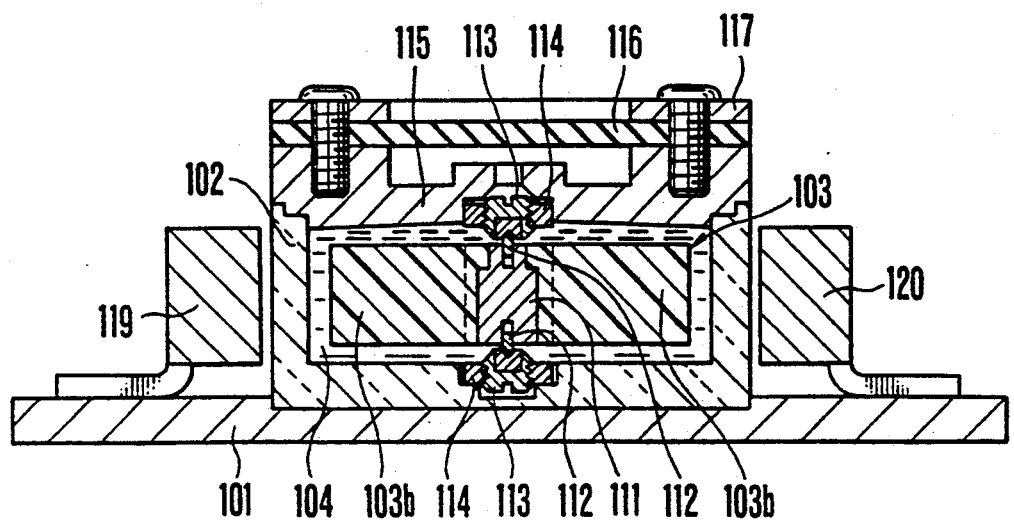
FIG. 4 is a diagrammatic cross-sectional view of the device of FIG. 3.
Figure 5:
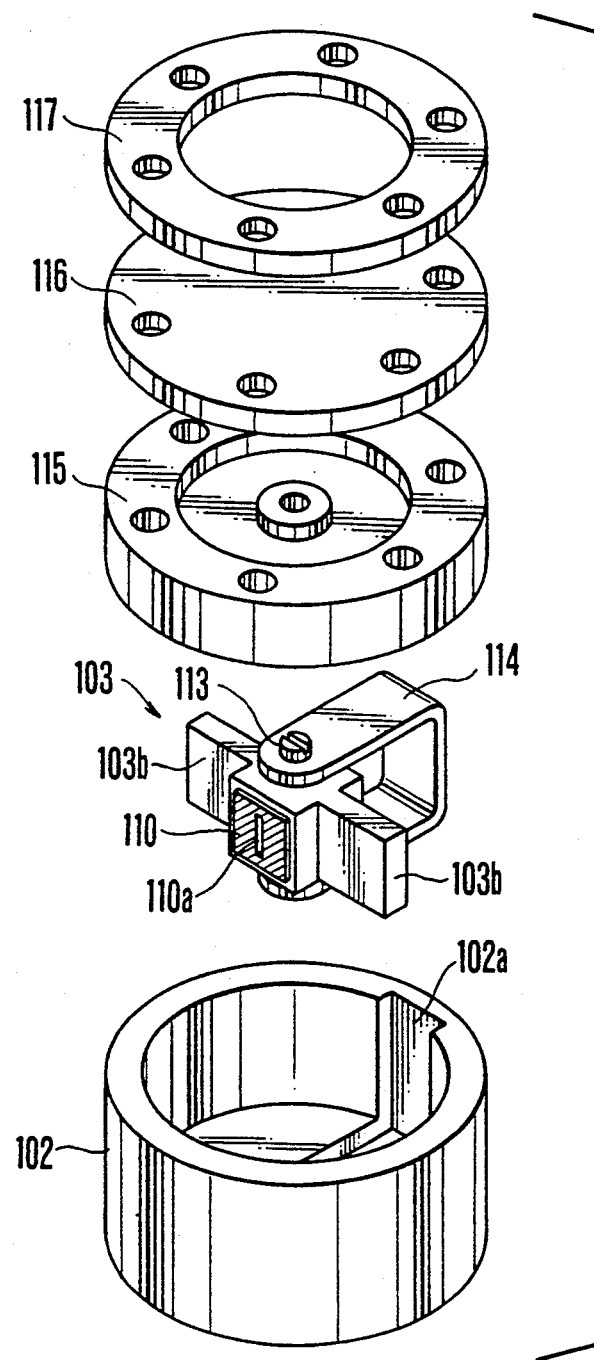
FIG. 5 is a partial exploded perspective view showing the device of FIG. 3, as would be seen from plane IV-IV of FIG. 3.

FIG. 2 is a diagrammatic cross-sectional view of an angular displacement detecting device, showing another embodiment of the present invention. In FIG. 2, like reference numerals are used to denote elements which perform functions similar to those of the elements used in the embodiment of FIG. 1, and description thereof is omitted for the sake of simplicity.

Referring to FIG. 2, predetermined elements such as the floating body 103 are incorporated in the tubular casing 102, and a lid 10 is bonded to the tubular casing 102 in a sealed manner by a known art utilizing an adhesive, welding or the like. A middle portion 10a of the lid 10 is formed into a flat dome-like configuration by vacuum forming, to define the capacity adjusting chamber 4. To maximize the flexibility of the dome-like thin portion 10a, the material of the lid 10 is preferably selected from among resins, such as polyethylene, which can exhibit good flowablility during forming. A partition 11 separates the capacity adjusting chamber 4 and the chamber of the tubular protects the floating body 103 from the influence of irregular fluid flows caused by the irregular deformation of the dome-like thin portion 10a. The partition 11 has an opening 11a in the central portion which communicates with the capacity adjusting chamber 4.

It will be readily understood that, in the above-described arrangement, the dome-like thin portion 10a can provide advantages similar to those of the capacity adjusting chamber 4 formed by the thin resin films shown in the embodiment of FIG. 1. In such arrangement, since no thin resin film is needed, the number of parts is reduced and manufacturing steps such as welding can be omitted, whereby costs can be reduced.

Although each of the above-described embodiments refers to an angular displacement detecting device, the present invention can, of course, be applied to devices of various kinds for performing detection of relative movement, such as displacement detection, velocity detection, angular-velocity detection, acceleration detection and angular-acceleration detection.

What is claimed is:

1. An angular displacement detecting device comprising:
   (A) a fluoroliquid;
   (B) a tubular casing having a chamber in which said fluoroliquid is sealed;
   (C) a detecting body disposed in said fluoroliquid sealed in said chamber and supported for rotation about a predetermined rotational axis; and
   (D) detecting means for detecting the relative angular displacement between said detecting body and said tubular casing about said rotational axis.

2. An angular displacement detecting device according to claim 1, wherein said fluoroliquid includes fluoroalkane derivative.

3. An angular displacement detecting device according to claim 1, wherein said fluoroliquid includes fluoroalkene derivative.

4. An angular displacement detecting device according to claim 1, wherein said fluoroliquid includes fluoroalkyne derivative.

5. An angular displacement detecting device according to claim 1, wherein said fluoroliquid includes polyfluoroalkyl ether derivative.

6. An angular displacement detecting device according to claim 1, wherein said fluoroliquid includes cyclic fluoroether derivative.

7. An angular displacement detecting device according to claim 1, wherein said fluoroliquid includes a nitrogen-containing fluorocompound derivative.

8. An angular displacement detecting device according to claim 1, wherein said fluoroliquid includes a perfluoro-type fluoroliquid.

9. An angular displacement detecting device according to claim 1, wherein said tubular casing includes capacity adjusting means for adjusting the capacity of said chamber in which said fluoroliquid is sealed.

10. An angular displacement detecting device according to claim 9, wherein said capacity adjusting means includes pressure means for increasing the pressure of said chamber in which said fluoroliquid is sealed.

11. An angular displacement detecting device according to claim 10, wherein said pressure means includes elastic means for exerting pressure.

12. An angular displacement detecting device according to claim 9, wherein said capacity adjusting means includes following means for causing the capacity of said chamber in which said fluoroliquid is sealed to follow the volume of said fluoroliquid sealed therein.

13. An angular displacement detecting device according to claim 12, wherein said following means includes elastic means for providing a following motion.

14. An angular displacement detecting device comprising:
   (A) a tubular casing having a chamber in which a liquid is sealed;
   (B) a detecting body disposed in said liquid sealed in said chamber and supported for rotation about a predetermined rotational axis;
   (C) detecting means for detecting the relative angular displacement between said detecting body and said tubular casing about said rotational axis; and
   (D) capacity adjusting means for adjusting the capacity of said chamber of said tubular casing in which said liquid is sealed.

15. An angular displacement detecting device according to claim 14, wherein said capacity adjusting means includes pressure means for increasing the pressure of said chamber in which said liquid is sealed.

16. An angular displacement detecting device according to claim 15, wherein said pressure means includes elastic means for exerting pressure.

17. An angular displacement detecting device according to claim 14, wherein said capacity adjusting means includes following means for causing the capacity of said chamber in which said liquid is sealed to follow the volume of said liquid sealed therein.

18. An angular displacement detecting device according to claim 17, wherein said following means includes elastic means for providing a following motion.

19. A relative movement detecting device comprising:
   (A) a fluoroliquid;

(B) a sealing structure in which said fluoroliquid is sealed;
(C) a movable structure supported for movement together with said fluoroliquid sealed in said sealing structure; and
(C) detecting means for detecting the relative movement between said sealing structure and said movable structure.

20. A relative movement detecting device according to claim 19, wherein said fluoroliquid includes fluoroalkane derivative.

21. A relative movement detecting device according to claim 19, wherein said fluoroliquid includes fluoroalkene derivative.

22. A relative movement detecting device according to claim 19, wherein said fluoroliquid includes fluoroalkyne derivative.

23. A relative movement detecting device according to claim 19, wherein said fluoroliquid includes polyfluoroalkyl ether derivative.

24. A relative movement detecting device according to claim 19, wherein said fluoroliquid includes cyclic fluoroether derivative.

25. A relative movement detecting device according to claim 19, wherein said fluoroliquid includes a nitrogen containing fluorocompound derivative.

26. A relative movement detecting device according to claim 19, wherein said fluoroliquid includes a perfluoro-type fluoroliquid.

27. A relative movement detecting device according to claim 19, wherein said sealing structure includes capacity adjusting means for adjusting the capacity of a chamber in which said fluoroliquid is sealed.

28. A relative movement detecting device according to claim 27, wherein said capacity adjusting means includes pressure means for increasing the pressure of said chamber in which said fluoroliquid is sealed.

29. A relative movement detecting device according to claim 28, wherein said pressure means includes elastic means for exerting pressure.

30. A relative movement detecting device according to claim 27, wherein said capacity adjusting means includes following means for causing the capacity of said chamber in which said fluoroliquid is sealed to follow the volume of said fluoroliquid sealed therein.

31. A relative movement detecting device according to claim 30, wherein said following means includes elastic means for providing a following motion.

32. A relative movement detecting device comprising:
(A) a sealing structure in which said fluoroliquid is sealed;
(B) a movable structure supported for movement together with said fluoroliquid sealed in said sealing structure;
(C) detecting means for detecting the relative movement between said sealing structure and said movable structure; and
(D) capacity adjusting means for adjusting the capacity of a chamber of said sealing structure in which said fluoroliquid is sealed.

33. A relative movement detecting device according to claim 32, wherein said capacity adjusting means includes pressure means for increasing the pressure of said chamber in which said liquid is sealed.

34. A relative movement detecting device according to claim 33, wherein said pressure means includes elastic means for exerting pressure.

35. A relative movement detecting device according to claim 32, wherein said capacity adjusting means includes following means for causing the capacity of said chamber in which said liquid is sealed to follow the volume of said liquid sealed therein.

36. A relative movement detecting device according to claim 35, wherein said following means includes elastic means for providing a following motion.

* * * * *

UNITED STATES PATENT AND TRADEMARK OFFICE
CERTIFICATE OF CORRECTION

PATENT NO. : 5,117,104
DATED      : May 26, 1992
INVENTOR(S) : Naoki Kobayashi; Kazuhiro Oki and Shoichi Shimura It is certified that error appears in the above-identified patent and that said Letters Patent is hereby corrected as shown below:

Col. 1, lines 60, 62.  Change "110" to -- 110' --

Col. 3, line 2.  Change "110" to -- 110' --

Col. 6, line 14.  Delete "X"

Col. 7, line 33.  After "tubular" insert -- casing 102 which
                     accommodates the floating body 103, and --

Signed and Sealed this

Thirteenth Day of July, 1993

Attest:

MICHAEL K. KIRK

Attesting Officer

Acting Commissioner of Patents and Trademarks